Figure 1:
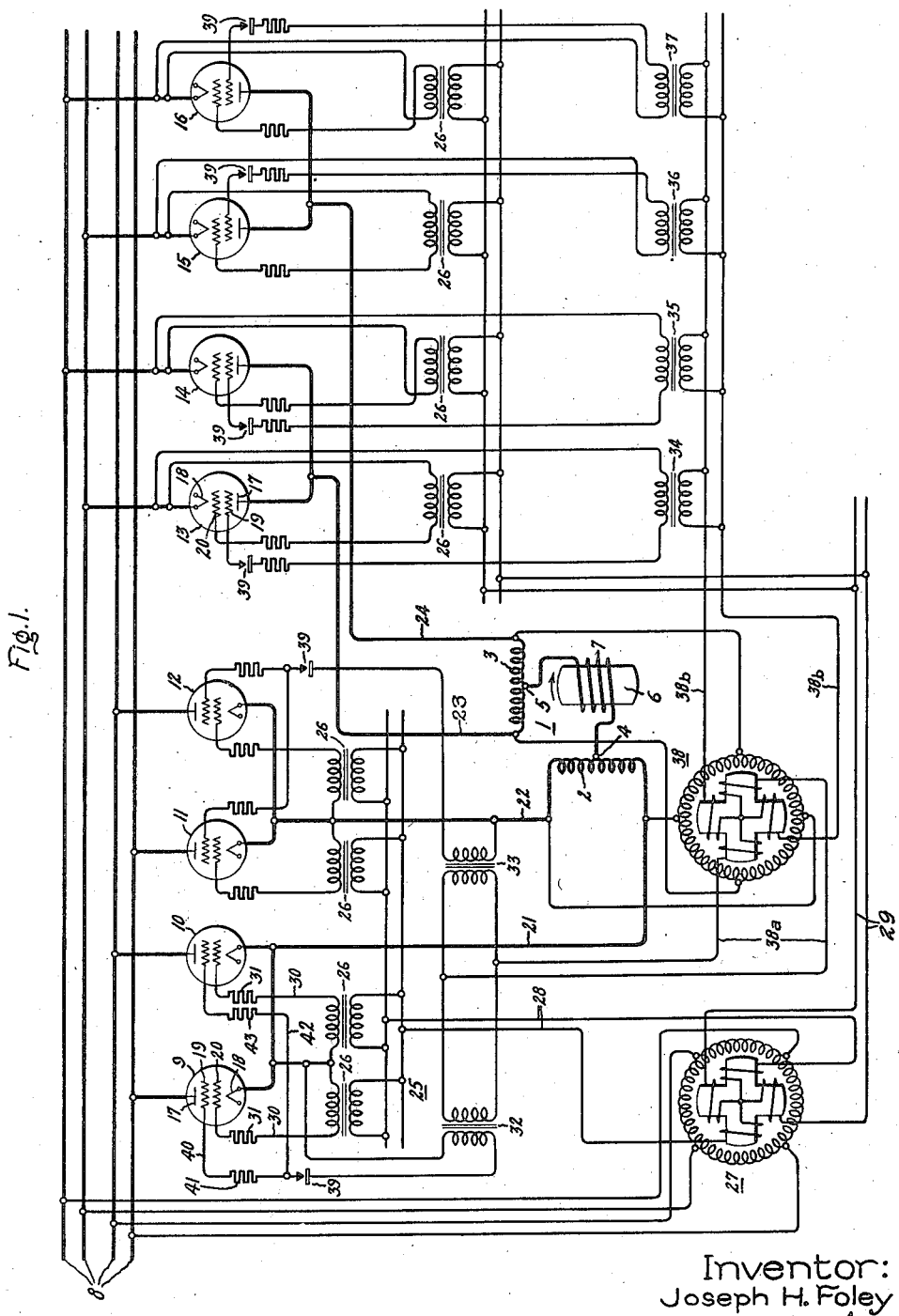

Patented June 28, 1938

2,122,282

UNITED STATES PATENT OFFICE 2,122,282

ELECTRIC VALVE TRANSLATING SYSTEM

Joseph H. Foley, Schenectady, N. Y., assignor to General Electric Company, a corporation of New York Application February 29, 1936, Serial No. 66,380

10 Claims. (Cl. 250—27)

My invention relates to electric valve translating circuits and more particularly to an improved control circuit for electric valve translating apparatus for transmitting energy between alternating current circuits and between alternating and direct current circuits.

Heretofore there have been devised numerous electric valve arrangements for transmitting energy between direct current and alternating current circuits and between alternating current circuits. Coincidently therewith there have been developed various control systems for controlling the conductivity of the main power electric valves in accordance with electrical conditions of the associated supply and load circuits. These control circuits have heretofore comprised complicated and intricate arrangements for obtaining the desired control of the associated power electric valves. Some of these arrangements have involved the use of mechanical devices, such as commutators or distributors, acting in conjunction with electrical apparatus to control the conductivity of the power electric valves in accordance with one or more different electrical conditions. The prior art arrangements have therefore been subjected to inherent limitations as concerns operating characteristics and the field of application. In view of these inherent limitations there has been evidenced a decided need for control apparatus entirely electrical in nature and operation for controlling electric valves of the gaseous type employing one or more control members.

It is an object of my invention to provide an improved electric valve translating circuit and method of operation thereof for transmitting energy between direct and alternating current circuits and between alternating current circuits of the same or different frequencies.

It is another object of my invention to provide an improved control circuit for electric valve translating apparatus for transmitting energy between an alternating current circuit of constant frequency and an alternating current circuit of variable frequency.

It is a further object of my invention to provide an improved excitation circuit and method for controlling the conductivity of electronic discharge devices of the gaseous type employing two or more control members.

In accordance with the illustrated embodiments of my invention I provide improved control or excitation circuits for electric valve translating apparatus employing electric valves of the gaseous type having two control members. These electric valves each comprise an anode, a cathode and at least two control members, the conductivity of which may be controlled by impressing suitable potentials upon the respective control members. That is, each of these electric valves may be maintained non-conductive by impressing upon one of the control members a potential sufficiently negative relative to the cathode to prevent the initiation of an electrical discharge within the enclosing receptacle. And these valves may be rendered conductive by concurrently impressing upon each of the respective control members potentials sufficiently positive relative to the cathode. Of course, the relative magnitudes of the various potentials employed to obtain the desired operation will vary in accordance with the characteristics of the particular electric valve employed. I have found that to control the conductivity of one of these valves in accordance with two different electrical conditions, reliable and accurate control may be obtained by impressing a sufficiently negative potential upon one of the control members during the period in which it is desired to maintain the valve non-conductive and by removing this negative potential impressed upon this control member during the period in which it is desired to render the electric valve conductive. As a means for accomplishing this desirable operating characteristic, I have found that devices having unidirectional conducting characteristics, such as copper oxide rectifiers connected to suppress the positive half cycles of alternating potential supplied to one of the control members, operate very satisfactorily.

For a better understanding of my invention, reference may be had to the following description taken in connection with the accompanying drawings and its scope will be pointed out in the appended claims.

Figure 2:
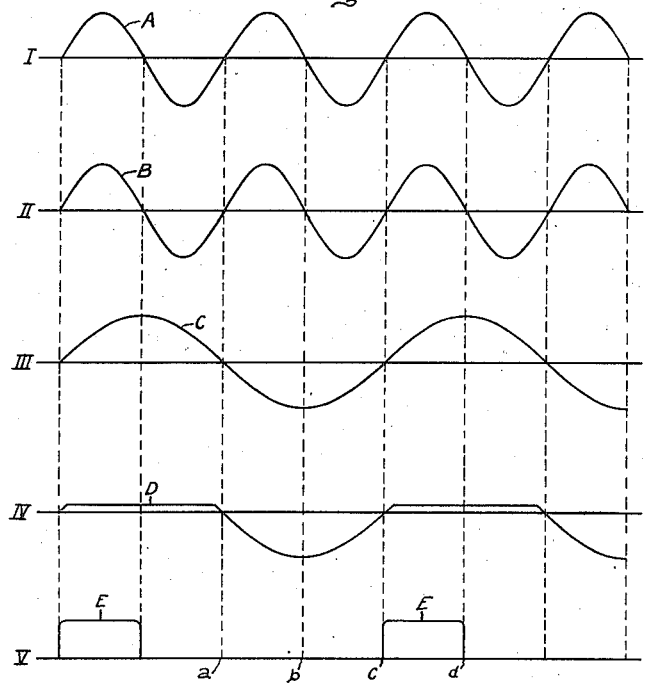
Figure 3:
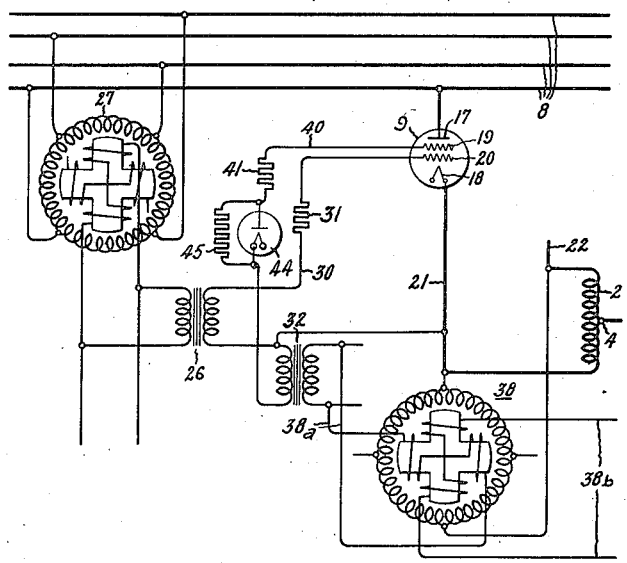

Fig. 1 of the drawings diagrammatically illustrates an embodiment of my invention as applied to an electric valve translating circuit for energizing a dynamo-electric machine of the synchronous type, while Fig. 2 represents certain operating characteristics of the excitation circuit employed in Fig. 1, and Fig. 3 of the accompanying drawings diagrammatically represents a modified embodiment of my invention as applied to one of the electric valves of the arrangement shown in Fig. 1.

Referring now to Fig. 1 of the drawings, my invention is diagrammatically illustrated as applied to electric valve translating apparatus for energizing a dynamo-electric machine of the synchronous type. The dynamo-electric machine 1 comprising inductive phase windings 2 and 3 having electrical neutrals 4 and 5, respectively, a rotating member 6 and an inductive field winding 7 is energized from a quarter phase alternating current supply circuit 8 through electric valves 9–16, inclusive. Each of these electric valves has an anode 17, a cathode 18 and control members 19 and 20. The groups of electric valves 9, 10 and 11, 12 function as controlled rectifiers to supply unidirectional current to the lower portion and upper portion respectively, of phase winding 2 of machine 1 and the groups of oppositely disposed valves 13, 14 and 15, 16 operate as controlled rectifiers to return this unidirectional current to the supply circuit 8 through the left-hand portion and the right-hand portion, respectively, of phase winding 3. The electric valves 9 and 10 are connected to the lower terminal of phase winding 2 through a conductor 21 and the electric valves 11 and 12 are connected to the upper terminal of phase winding 2 through a conductor 22. Valves 13, 14 and 15, 16 are connected to the left-hand terminal and the right-hand terminal of phase winding 3 through conductors 23 and 24, respectively. This system, employing electric valves of the gaseous type having at least two control members, is disclosed and broadly claimed in a copending application of E. F. W. Alexanderson, Serial No. 66,432 filed February 29, 1936, and assigned to the assignee of the present application.

To provide means for controlling the conductivity of each of the electric valves 9–16 in accordance with two different electrical conditions, such as the voltage of an alternating current supply circuit 8 and an operating condition of the machine 1, I employ a plurality of excitation circuits 25 each of which is associated with a predetermined one of the main electric valves 9–16. Each of the excitation circuits 25 comprises a transformer 26 which is energized in accordance with an electrical condition, such as the voltage of the alternating current circuit 8, through any suitable phase shifting arrangement such as the rotary phase shifting device 27. The transformers 26 associated with the excitation circuits of electric valves 9–12 are energized through conductors 28 from one phase of the quarter phase output circuit of phase shifter 27 and the corresponding transformers for electric valves 13–16 are energized through conductors 29 from the other phase of the quarter phase output circuit of phase shifter 27. The secondary windings of the transformers 26 are employed as sources of alternating potential and are arranged to impress upon the control members 20 of electric valves 9–16, through conductors 30 and resistances 31, potentials which vary in accordance with the voltage of the alternating current circuit 8. It will be understood that these control members 20 tend to control the conductivity of valves 9–16 in accordance with the voltage of circuit 8 to render each valve in the respective groups alternately conductive to effect full wave rectification of the current of the associated phase of the quarter phase circuit 8.

To control the conductivity of electric valves 9–16 in accordance with an operating condition of the machine 1, such as the voltage of the respective phase windings, I employ transformers 32–37, inclusive. For example, the transformer 32 is energized through a suitable phase shifter 38 and conductors 38a in accordance with the voltage appearing across phase winding 2 of machine 1 and the secondary winding of transformer 32 is employed as a source of alternating potential to impress negative potentials on the control members 19 of electric valves 9 and 10 during those intervals in which it is desired to maintain the electric valves 9 and 10 non-conductive. The phase shifter 38 is employed to permit adjustment of the phase of the potentials impressed on the control members 19 thereby providing a means for adjusting the time at which the current is commutated between the portions of phase windings 2 and 3. To suppress or modify the positive half-cycles of potential appearing across the secondary windings of transformers 32, I employ any suitable device having unidirectional conducting characteristics, such as a contact rectifier 39. The lower terminal of a secondary winding of transformer 32 is connected through the rectifier 39 to control member 19 of electric valve 9 through a conductor 40 and a resistance 41, and this terminal of the secondary winding of transformer 32 is connected through the rectifier 39 to the control member 19 of electric valve 10 through a conductor 42 and a resistance 43. The transformer 33 is similarly associated with electric valves 11 and 12. Since electric valves 13–16 are oppositely disposed and since the cathodes of these valves are not maintained at the same potential, it is desirable to employ separate transformers, that is transformers 34–37, respectively, for each of these valves. Transformers 34–37 are energized through phase shifter 38 and conductors 38b in accordance with the voltage appearing across phase winding 3 of machine 1, and are employed as sources of alternating potential to impress negative potentials on the control members 19 of valves 13–16 respectively during those intervals in which it is desired to maintain these valves non-conductive.

While I have shown my invention as applied to an electric valve translating circuit for transmitting energy between a quarter phase alternating current circuit and a variable frequency alternating current load circuit, it should be understood that my invention in its broader aspects may be applied to electric translating circuits generally.

In explaining the operation of the embodiment of my invention diagrammatically illustrated in Fig. 1, let it be assumed that the rotating member 6 of the dynamoelectric machine 1 has been started by some auxiliary means, such as an auxiliary starting motor or an auxiliary starting apparatus energized from the supply circuit 8. Let it be further assumed that the machine 1 is rotating at approximately half synchronous speed, that various groups of electric valves functioning to supply unidirectional current to the various portions of the phase windings 2 and 3 in a predetermined sequence to produce a torque upon the rotating member 6. If the rotary phase shifter 27 is adjusted to retard the phase of the alternating current impressed upon the control members 20 of electric valves 9–16, the average voltage which each of these electric valves supplies and hence the average current which each of these valves conducts will be relatively small and the machine 1 may be rotated at a relatively low speed. As the phase of the alternating potentials impressed upon the control members 20 of valves 9–16 is advanced relative to the potentials impressed upon the respective anodes 17, the average voltage, and hence the average current, will be increased to accelerate the member 6 at a rate dependent upon the connected load. In order to establish a rotating field by virtue of the armature phase windings 2 and 3, it is of course essential that the various groups of electric valves selectively energize the various portions of the phase windings 2 and 3. For example, it is necessary to energize the portions of the respective phase windings at a predetermined time relative to the angular position of the rotating member 6 to produce a torque upon the rotating member. If it be assumed that in a position corresponding to that shown in Fig. 1 the rotor 6 is in a torque producing position relative to the lower half of a phase winding 2, the electric valves 9 and 10 should conduct unidirectional current through conductor 21 to the lower half of the phase winding 2, and electric valves 13 and 14 should be rendered conductive to return this current through the field winding 7 and through the left-hand portion of phase winding 3 and through conductor 23. After the rotating member 6 has been rotated through substantially 90 mechanical degrees, assuming a 2 pole motor, the unidirectional current will be successively commutated or transferred from the lower portion of phase winding 2 to the upper portion of phase winding 2. In the latter assumed position, the electric valves 11 and 12 will function as a biphase rectifier to furnish unidirectional current to the upper portion of the phase winding 2 and the electric valves 15 and 16 will return this current through field winding 7 and the right-hand portion of phase winding 3 and through conductor 24.

In view of the above description, it will be understood that it is desirable to control the conductivity of each pair of electric valves, such as valves 9, 10 and 11, 12, etc., in accordance with an operating condition of the motor 1, such as the voltage or frequency, in order to obtain the desired periodic transfer or commutation of current between the proper portions of the phase windings in a predetermined sequence.

Since the transformers 32-37 are energized in accordance with the voltage appearing across the respective phase windings, the voltage appearing across the secondary windings of these transformers may be employed to control the conductivity of the associated main electric valves to effect this desired periodic energization of the phase windings. The control members 19 and 20 of electric valves 9-16 cooperate to conjointly control the conductivity of each of the electric valves. That is, either of the control members 19 or 20 may maintain the electric valves nonconductive by impressing upon the control member a potential sufficiently negative relative to the cathode to prevent the initiation of a discharge between the anode and cathode. And conversely, each of the electric valves 9-16 may be rendered conductive through the cooperative relationship of the control members 19 and 20 by impressing concurrently upon these control members suitable potentials. The magnitude of these various potentials required to obtain the predetermined operation of the electric valve is, of course, dependent upon the characteristics of the particular valve employed. To maintain the electric valves 9-16 non-conductive during predetermined intervals in which it is not desired to energize that portion of the respective windings to which the electric valves are connected, suitable negative potentials are impressed upon the control members 19 which prevent the valves from becoming conductive even though relatively positive potentials are impressed upon the control members 20. For example, by virtue of the copper oxide rectifiers 39, the positive half cycles of potential appearing across the secondary winding of transformer 32 are suppressed; that is, during this portion of each cycle the potential of the control members 19 is substantially that of the cathode.

During these intervals the electric valves may be rendered conductive by impressing a suitable potential upon the control members 20. However, during the negative half cycles of alternating potential appearing across the secondary winding of transformer 32, a potential sufficiently negative is impressed upon the control member 19 to prevent the control member 20 from rendering the electric valve conductive. In this manner the excitation circuits 25 operate to positively control the conductivity of each of the electric valves 9-16 in accordance with two different predetermined electrical conditions. That is, each of these valves is controlled in accordance with the voltage of the associated phase of the supply circuit 8 and is also controlled in accordance with the voltage of the associated phase winding of machine 1.

Referring now to Fig. 2 of the drawings, which represents certain operating characteristics of the excitation circuits 25, curve A of Diagram 1 represents the alternating potential of the phase of circuit 8 associated with electric valve 9. Curve B of Diagram II represents the voltage impressed upon the control member 20 of electric valve 9 and curve C of Diagram III represents the lower frequency voltage appearing across the phase winding of machine 1. Curve D of Diagram IV represents the potential impressed upon the control member 19 of electric valve 9, and curve E of Diagram V shows the current conducted by electric valve 9. During the interval $a$—$b$ it will be noted that since the voltage impressed upon the control member 19 is negative as represented by curve D of Diagram IV, electric valve 9 is not conductive even though the potential impressed upon the control member 20 is positive relative to the cathode as represented by the corresponding portions of curve B shown in Diagram II. However, during interval $c$—$d$, since the potential impressed upon the control member 19 is at approximately the same potential as the cathode, as shown by curve D of Diagram IV, the electric valve 9 is rendered conductive and conducts current during the positive half cycle of the potential of the associated phase of circuit 8. In this manner, each of the electric valves is controlled in accordance with two different predetermined electrical conditions.

Referring now to Fig. 3 of the drawings, a modification of my invention is diagrammatically illustrated as applied to a single electric valve, for example electric valve 9, of the embodiment of my invention shown in Fig. 1. Corresponding elements in Fig. 3 have been assigned like reference numerals. In place of the copper oxide rectifier 39 of Fig. 1, I employ an electronic discharge device 44 preferably of the gaseous type. A relatively high resistance 45 is connected in parallel with the electronic device 44. The resistance 45 serves to conduct a relatively small current during the positive half cycle of potential appearing across the secondary winding of transformer 32.

The operation of the embodiment of my invention diagrammatically illustrated in Fig. 3 of the drawings is substantially the same as that described in connection with the embodiment of my invention shown in Fig. 1. The electronic device 44, acting in conjunction with the resistance 45, substantially suppresses the positive half cycles of alternating potential appearing across the secondary winding of transformer 32, permitting the electric valve 9 to be rendered conductive by the control member 20 during the intervals corresponding to the positive half cycles, but maintains the electric valve 9 non-conductive by means of the control member 19 during the negative half cycles of potential appearing across the secondary winding of transformer 32.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In an excitation circuit for an electric valve of the gaseous type having two control members, means for impressing on one of said control members a potential to maintain said valve non-conductive and to render ineffective the other of said control members, and means for modifying said potential in accordance with a predetermined electrical condition to permit said other of said control members to render said valve conductive during intervals established by said electrical condition.

2. In combination, a supply circuit, a load circuit, an electric translating circuit interconnecting said circuits comprising an electric valve of the gaseous type having two control members, and a circuit for controlling the conductivity of said electric valve comprising means for impressing on one of said control members a potential sufficiently negative to maintain said valve non-conductive and to render ineffective the other of said control members and means for modifying said potential in accordance with a predetermined electrical condition to permit said other of said control members to render said valve conductive during intervals established by said electrical condition.

3. In combination, a supply circuit, a load circuit, an electric translating circuit interconnecting said circuits comprising an electric valve of the gaseous type having two control members, and a circuit for controlling the conductivity of said electric valve comprising a source of alternating potential, means for impressing on one of said control members only the negative half-cycles of said potential to maintain said valve non-conductive and to render ineffective the other of said control members during said negative half-cycles, means for modifying said potential to permit said other of said control members to render said valve conductive and means for adjusting the phase of said potential.

4. The method of controlling the conductivity of an electric valve of the gaseous type having two control members, which comprises maintaining said valve non-conductive by energizing one of said control members from a source of alternating potential and impressing on said one of said control members only the negative half-cycles of potential of said source to render ineffective the other of said control members during said negative half cycles, and permitting said other of said control members to initiate an electrical discharge during the positive half-cycles of potential of said source.

5. In an excitation circuit for an electric valve of the gaseous type having two control members, a source of alternating potential for one of said control members, and means for impressing only negative half-cycles of potential on one of said control members to maintain said valve non-conductive and to render ineffective the other of said control members during said negative half cycles.

6. In an excitation circuit for an electric valve of the gaseous type having two control members for conjointly controlling the conductivity of said valve, a source of alternating potential for energizing one of said control members, and means comprising a device having unidirectional conducting characteristics for impressing only the negative half cycles of potential on said control member to maintain said valve non-conductive and to render ineffective the other of said control members during said negative half-cycles.

7. In combination, an electric valve of the gaseous type having two control members for conjointly controlling the conductivity of said valve, a source of alternating potential for energizing one of said control members, and means comprising a unidirectional conducting device connected in series relation with respect to said source and said control member for impressing only the negative half-cycles of potential on said control member to maintain said valve non-conductive and to render ineffective the other of said control members during said negative half-cycles.

8. In combination, an electric valve of the gaseous type having two control members for conjointly controlling the conductivity of said valve, a source of alternating potential for energizing one of said control members, and means comprising a parallel-connected electronic discharge device and a resistance of relatively large value connected in series relation with said source and said control member for substantially suppressing the positive half-cycles of potential and for impressing only the negative half-cycles of potential on said control member to maintain said valve non-conductive and to render ineffective the other of said control members during said negative half-cycles.

9. In combination, a supply circuit, a load circuit, electric translating apparatus including an electric valve of the gaseous type having two control members, a source of alternating potential for energizing one of said control members in accordance with an electrical condition of said load circuit, a second source of alternating potential for energizing the other of said control members in accordance with an electrical condition of said supply circuit, and means comprising a unidirectional conducting device for impressing only negative half-cycles of potential of said first mentioned source on said one of said control members to maintain said valve non-conductive and to render ineffective said other of said control members during said negative half-cycles, said means permitting said second source of potential to render said valve conductive through said other control member during intervals when the potentials of both of said sources are positive.

10. In an excitation circuit for an electric valve of the gaseous type having two internal control members, means for impressing on one of said control members a potential tending to render said electric valve conductive, and means independent of said first mentioned means for impressing on the other of said control members a potential to render ineffective said one of said control members during predetermined intervals established by a predetermined electrical condition and for modifying said second mentioned potential to permit said one of said control members to render said valve conductive during other predetermined intervals established by said electrical condition.

JOSEPH H. FOLEY.